(No Model.)
N. A. FISHER.
MOVING STREET CARS ON CURVES.
No. 289,904. Patented Dec. 11, 1883.
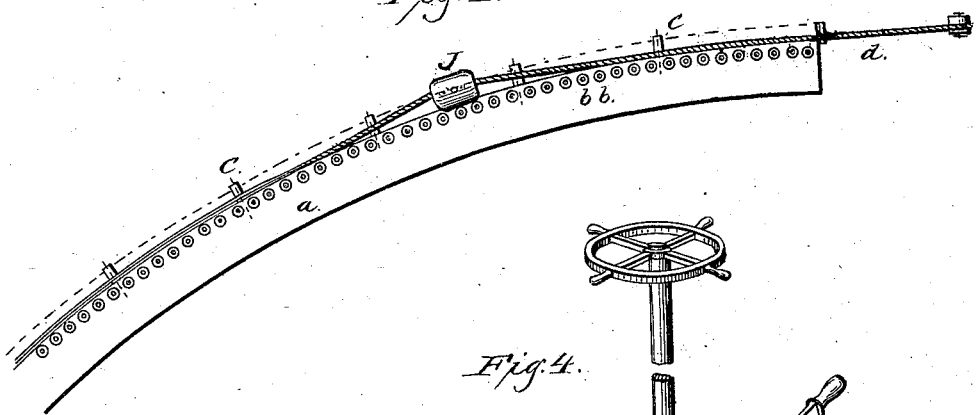
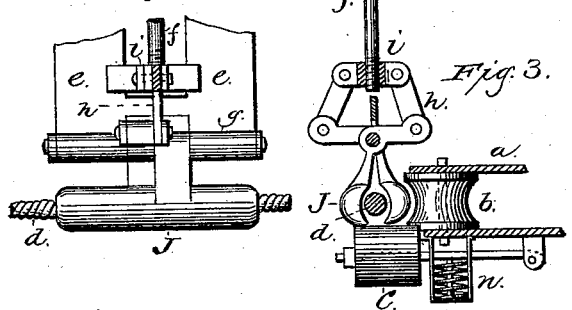
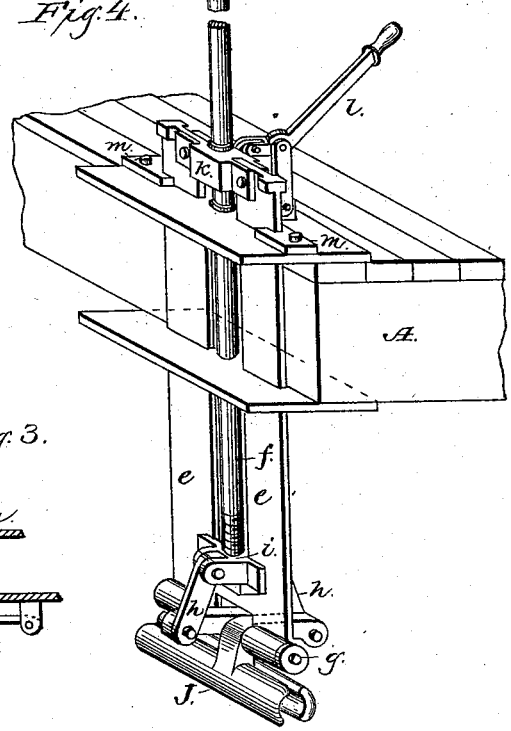
Witnesses:
Robert T. Devlin
Augustus E. Hopkins
Inventor;
Noble Andrew Fisher
by Frank Sheehy
Attorney

UNITED STATES PATENT OFFICE.

NOBLE ANDREW FISHER, OF SACRAMENTO, CALIFORNIA.

MOVING STREET-CARS ON CURVES.

SPECIFICATION forming part of Letters Patent No. 289,904, dated December 11, 1883.

Application filed December 28, 1882. (No model.)

*To all whom it may concern:*

Be it known that I, NOBLE ANDREW FISHER, a citizen of the United States, residing at Sacramento, in the county of Sacramento and State of California, have invented certain new and useful improvements in moving that class of cars which are propelled by endless wire ropes or cables around curves, as more fully hereinafter specified.

The objects of my invention are, first, to obtain the passage of a street-car or other vehicle over or around a curve by means of a wire rope passing continuously around said curve, by the combination of a clutch fastened to the car and two series of friction-rollers placed on the curve to receive the rope and to maintain the same in its position; and, second, to obtain the least possible deflection of the rope on its passage from the straight run to the curve, which deflection would naturally be caused by the necessary placing of the friction-rollers on the inside of said curve to admit of the passage of the said clutch around said curve. I attain these objects by the mechanism illustrated in the accompanying drawings, in which—

Figure 1 represents a section of the curved portion of a track, showing my invention as applied thereto. Fig. 2 represents a front elevation of the clutching mechanism forming a part of my invention. Fig. 3 shows a sectional view of the curved portion of the track and the clutch mechanism, and Fig. 4 is a perspective view of the mechanism entire as applied to the car.

The letter *a* indicates the curved portion of the track, *b* a series of vertical friction-rollers, and *c* a series of horizontal friction-rollers. The rollers *b b* carry the rope around the curve, and at the same time act as friction-rollers for the clutch J in its passage around the curve, as shown more clearly in Fig. 3, hereinafter explained. The rollers *c c* are hinged from the rear, and their weight sustained by a spiral spring, *n*, (shown in Fig. 3.)

In Fig. 1 the relative position of the clutch J and the friction-rollers *b b* are also shown, the clutch being illustrated in detail in Figs. 3 and 4 of the drawings.

In Fig. 2, *e* is the suspension-plate, and sustains the clutch J, which is hinged at *g* on suspension-plate aforesaid. *f* shows the screw that actuates the clutch J through the nut *i*, which said nut *i* is connected by the link *h* to the lever of jaw of clutch J.

In Fig. 3, *a* is the curved plate referred to in Fig. 1. *b* is one of the friction-rollers which act in a like capacity for both the rope *d* and clutch J. *c* is the friction-roller to sustain rope *d* and prevent its falling from the side of friction-roller *b*, which falling would occur by reason of the liability of said rope *d* to switch in its rapid transit across or around the curve. The spiral spring *n* raises the friction-roller *c* above the lower edge of the friction-roller *b*, to prevent any possibility of the jamming of the rope between friction-rollers *b* and *c*. *h* is the link that connects the jaw of the clutch J and nut *i*, the connection being made on the opposite side of the hinge-joint *g* of suspension-plate *e e*, so as to get a lifting purchase on clutch J. The nut *i* travels in the opening or slot shown in Figs. 2 and 4. *f* is the screw which actuates the nut *i*, which screw moves in the opening or slot aforesaid.

Fig. 4 shows the condition of the clutch as fastened to the car-deck A, and the practical working of my invention. *k* is box or bearing to sustain screw-shaft *f*. The said shaft *f* is provided with solid collars at either side of box *k*. The collars prevent the loss of motion in nut, and also provide for the opening and closing of clutch J on the screw *f* being turned to either right or left. *m m* are guide-plates which admit of the elevation and depression of suspension and clutch by means of the lever *l*, which said lever *l* enables the operator to elevate or depress the suspension-plate and clutch at pleasure, which depression enables the clutch to catch the rope on the sag between sustension-rollers on straight run. The elevation aforesaid, by means of the lever *l*, enables the operator to lift the clutch from contact with rope *d*.

What I claim as my invention, and desire to secure by Letters Patent, is—

1. The combination, in the mechanism for moving vehicles over curves by an endless wire rope, of the friction-rollers *b* and *c* on the curved plates *a*, the last-named rollers having a yielding or elastic support upon suitable springs, as and for the purposes specified.

2. The clutch J, consisting of two pivoted levers having suitable jaws to clamp the rope, and fulcrumed as described, the said levers being connected by links *h* to the nut *i*, which is connected to the rod *f*, the whole being arranged to operate in the manner and for the purpose specified.

NOBLE ANDREW FISHER.

Witnesses:
WILLIAM ALEXANDER ANDERSON,
FRANK J. DEVLIN.